R. DAKE.
VARIABLE SPEED GEARING.
APPLICATION FILED AUG. 14, 1917.
1,318,360.
Patented Oct. 14, 1919.
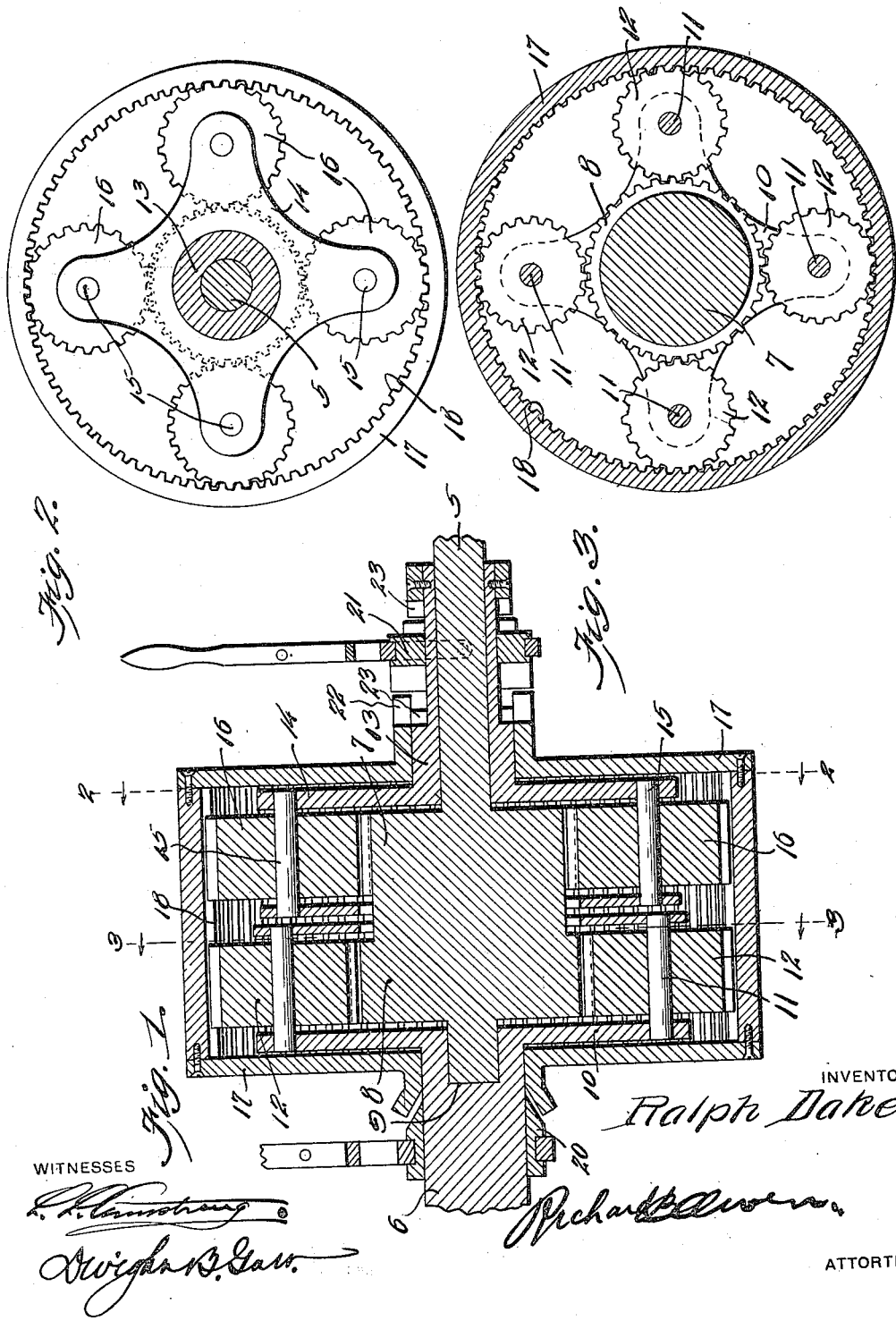
INVENTOR
Ralph Dake
WITNESSES
ATTORTEY

UNITED STATES PATENT OFFICE.

RALPH DAKE, OF ST. PAUL, MINNESOTA.

VARIABLE-SPEED GEARING.

1,318,360.

Specification of Letters Patent. Patented Oct. 14, 1919.

Application filed August 14, 1917. Serial No. 186,176.

*To all whom it may concern:*

Be it known that I, RALPH DAKE, a citizen of the United States, residing at St. Paul, in the county of Ramsey and State of Minnesota, have invented certain new and useful Improvements in Variable-Speed Gearing, of which the following is a specification.

This invention relates to variable speed gearing, having for its primary object to provide a speed gearing for operatively connecting two shafts in such manner that a relatively great number of speed variations may be attained in the driven shaft.

A further object of the invention is to provide a variable speed mechanism which shall be of simple construction and positive in operation, which includes a rotatable housing for the planetary pinions or gears that is capable of rotating or being locked against rotary movement, and which is employed in the accomplishment of the variable speeds, which is simple and easy of operation, and which will prove thoroughly practical in use.

With these objects in view together with others which will appear as the description proceeds, the invention resides in the novel formation, combination and arrangement of parts, all as will be described more fully hereinafter, illustrated in the drawings and particularly pointed out in the claim.

In the drawings:

Figure 1 is a vertical longitudinal section taken through a variable speed mechanism constructed in accordance with the invention, and illustrating the same as applied to driving and driven shafts, Fig. 2 is a transverse sectional view taken on line 2—2 of Fig. 1, and Fig. 3 is a similar view taken upon line 3—3 of Fig. 1.

Referring now particularly to the drawings, 5 indicates the driving or power shaft and 6 the driven shaft, the variable speed mechanism being interposed between these shafts.

The shafts 5 and 6 are axially alined, and the former shaft is provided with a pair of gears 7 and 8, these gears being of different diameters. These gears may be affixed to the shaft 5 in any approved manner or may be formed integral therewith, and the outer extremity of the shaft 5 seats within a socket 9 in the adjacent end of the shaft 6.

The shaft 6 is provided at its end with an enlarged disk 10, said disk having arranged therein a plurality of spaced stub shafts 11, upon each of which is rotatably mounted a pinion 12, the said pinions being in mesh with the enlarged gear 8 upon the shaft 5.

Rotatably mounted upon the shaft 5 inwardly from the end thereof is a sleeve 13, from the inner end of which projects an annular flange 14 carrying stub shafts 15, and each of the shafts 15 has rotatably mounted thereon a pinion 16, all of the pinions being in mesh with the smaller gear 7 upon the shaft 5. In the present instance, the disks or flanges 10 and 14 carried by the driven shaft and the sleeve 13, respectively, are provided with four of the stub shafts 11 and 15, but it is obvious that the number of planetary gears or pinions carried by the said disks may be varied.

Rotatably supported at its ends upon the shaft 6 and the sleeve 13 is a drum or housing 17, and this housing is provided upon its inner periphery with teeth 18. These teeth are in mesh with the teeth of the pinions 12 and 16.

When power is applied to the shaft 5, the pinions 12 and 16 will be rotated in a direction opposite to the direction of rotation of the said shaft and, assuming the housing or drum 17 being free to rotate, the said housing will be driven in the direction of rotation of the said pinions. When the housing 17 and sleeve 13 are free to rotate, power will not be transmitted to the driven shaft 6, as the planetary pinions or gears 12 carried thereby will rotate upon their shafts 11 as the housing rotates. Should the sleeve 13 be held against rotary movement, the housing 17 being free, rotary movement will be transmitted from the shaft 5, gear 7 and pinions 16 to the casing or housing 17, and the said casing will thus rotate at a speed different from that of the shaft. When the casing is held against rotation and the rotatable member carrying the pinions 16 is free, power will be transmitted to the driven shaft through the large gear 8 and pinions 12, the latter forcing the driven shaft to rotate.

Any approved means may be employed for making or braking the connection between the various rotatable members, and I have illustrated in Fig. 1 of the drawings clutch mechanisms for this purpose. A clutch head 20 is slidably mounted upon the driven shaft 6, and is capable of being moved into or out of locking connection with the adjacent end of the housing 17. A conventional form of clutch ring 21 is interposed between the clutch faces 22 and 23 on the casing 17 and sleeve 13, respectively. This ring may be moved into or out of engagement selectively with the said clutch faces, but may also be moved inwardly so as to lock the said clutch faces together to enable the casing and sleeve to rotate in unison.

It is obvious from the foregoing that I have provided a variable speed gearing which is of extremely simple construction and which is capable of being operated so as to produce a relatively great number of variations of speeds. Only conventional forms of clutches have been illustrated in the present instance, it being understood that clutch mechanisms of any preferred type may be used.

While the present is a disclosure of the preferred embodiment of the invention, it is to be understood that the invention is not limited thereto, as various changes in the minor details of construction, proportion and arrangement of parts may be resorted to if desired without departing from the spirit of the invention as defined by the appended claim.

What is claimed is:

A variable speed gearing, comprising alined drive and driven shafts, gears of different diameters rotatable with the drive shaft, a sleeve on the drive shaft, pinions carried by the driven shaft and sleeve, respectively, and in mesh with the said gears, a housing mounted on the driven shaft and sleeve and geared to the said pinions, a clutch for connecting the housing to the driven shaft, inner and outer clutch elements on the sleeve, clutch elements on the housing in the plane of the inner clutch elements of the sleeve and projecting outwardly therefrom some distance and a clutch ring slidable on the sleeve between the inner and outer clutch elements thereof and having clutch elements on opposite faces to coact with the inner and outer clutch elements of the sleeve, and the clutch elements on the inner face of the ring being adapted to engage the clutch elements of the housing only, or both the elements of the housing and the inner clutch elements of the sleeve.

In testimony whereof I affix my signature in presence of two witnesses.

RALPH DAKE.

Witnesses:
J. C. GAFFINGER,
FREDA MIEHEL.

Copies of this patent may be obtained for five cents each, by addressing the "Commissioner of Patents, Washington, D. C."